Jan. 1, 1924

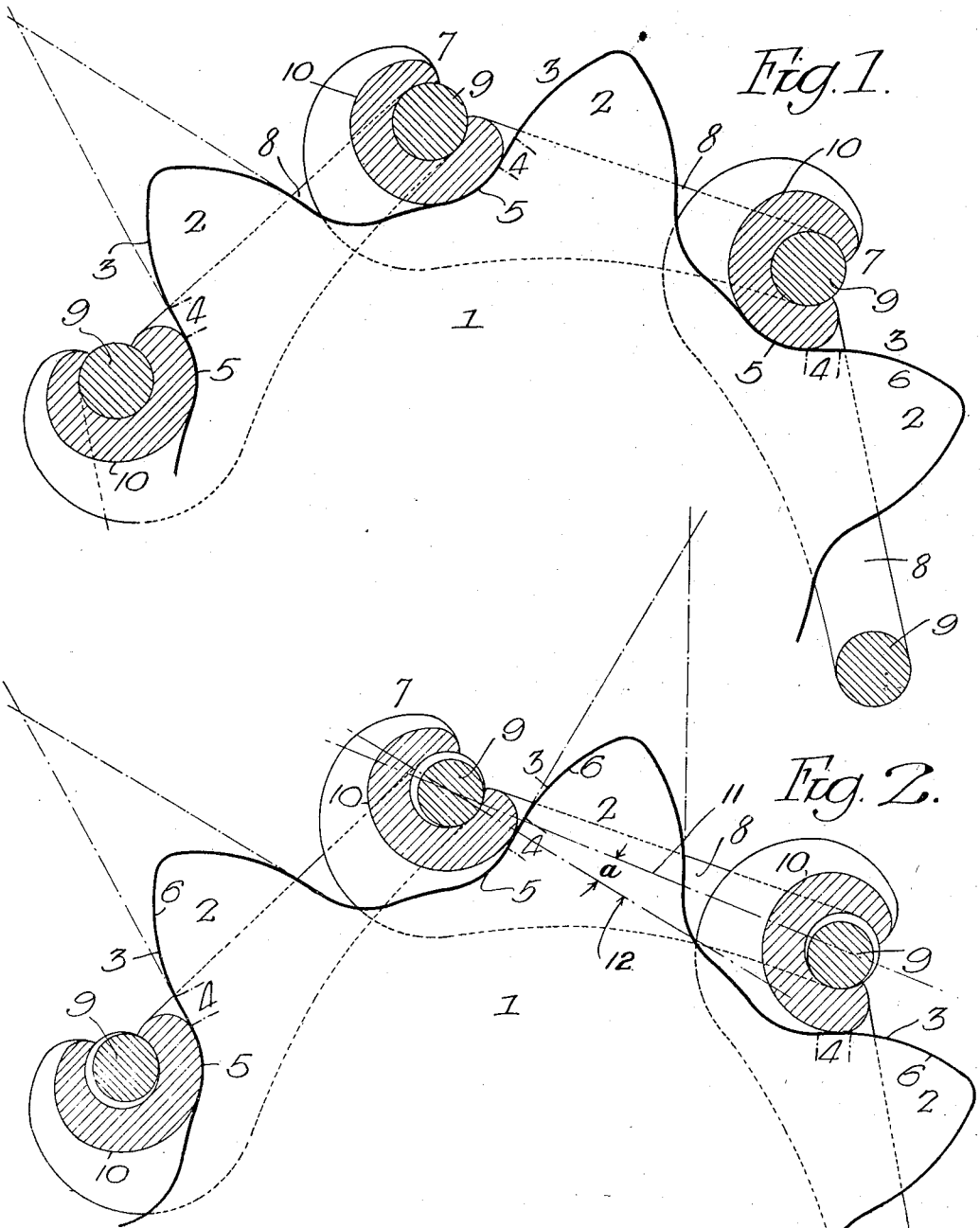

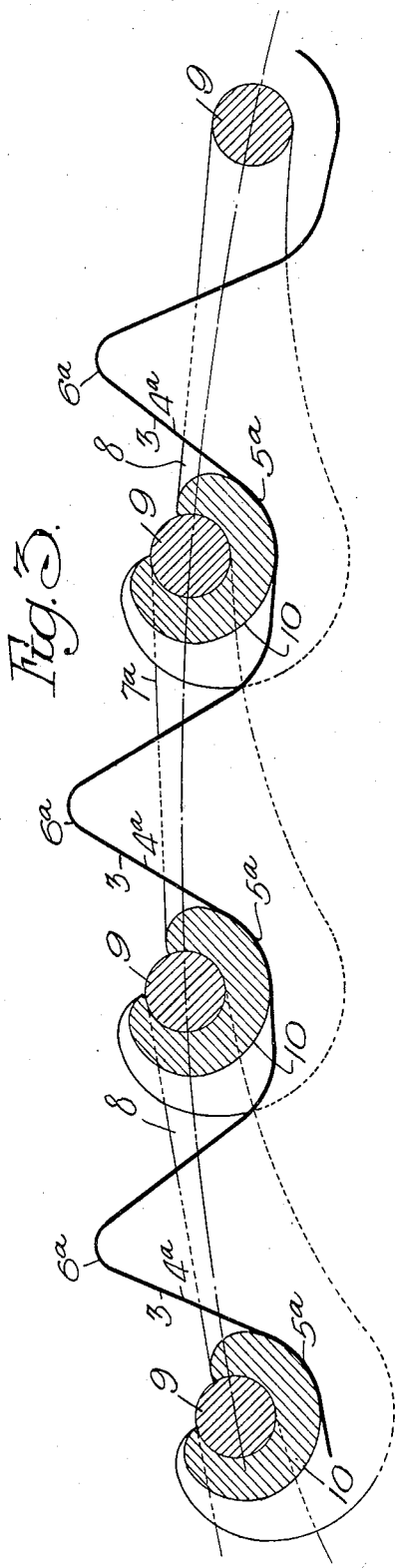
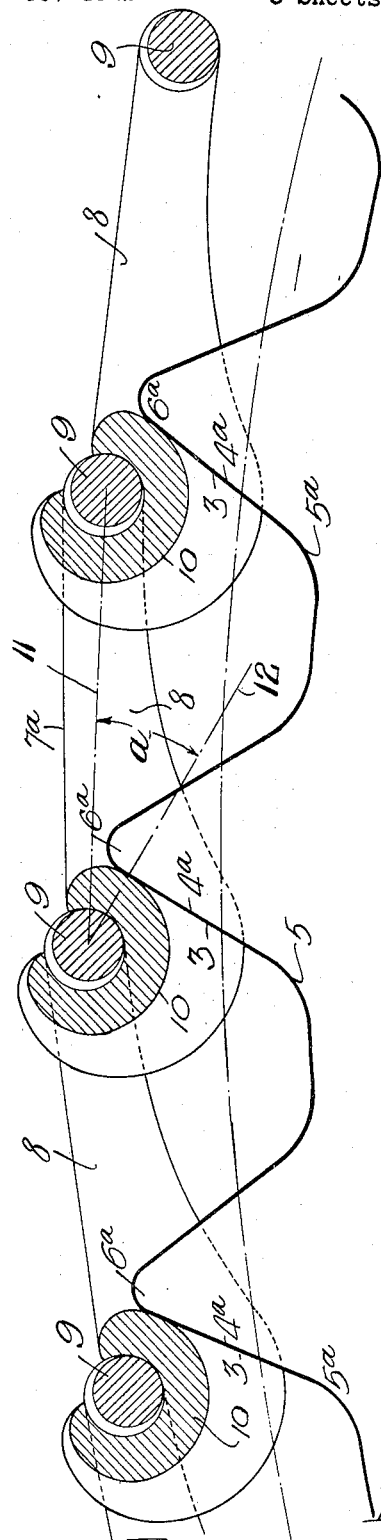

F. V. HETZEL

SPROCKET WHEEL

Filed Jan. 30, 1922  3 Sheets-Sheet 3

1,479,717

Inventor-
Frederic V. Hetzel.
by his Attorneys-
Howson & Howson

Patented Jan. 1, 1924.

1,479,717

UNITED STATES PATENT OFFICE.

FREDERIC V. HETZEL, OF WEST CHESTER, PENNSYLVANIA, ASSIGNOR TO LINK-BELT COMPANY, OF CHICAGO, ILLINOIS, A CORPORATION OF ILLINOIS.

SPROCKET WHEEL.

Application filed January 30, 1922. Serial No. 532,731.

*To all whom it may concern:*

Be it known that I, FREDERIC V. HETZEL, a citizen of the United States, residing in West Chester, Chester County, Pennsylvania, have invented certain Improvements in Sprocket Wheels, of which the following is a specification.

One object of my invention is to improve the construction of sprocket wheels intended to drive, or be driven by, a chain so that the wheel will run well with a stretched or worn chain.

A further object of the invention is to provide a flat bearing surface on each tooth of the sprocket wheel, the length and the angle of said bearing face being dependent upon the diameter of the wheel and the number of teeth.

The invention is particularly adapted for use in connection with chains, such as malleable iron chains, in which the links vary considerably in pitch as manufactured and in which the wear in the joints is sufficient to cause considerable elongation in pitch in service.

In the accompanying drawings:

Fig. 1 is a side view of a portion of a six tooth wheel with a new chain in position;

Fig. 2 is a view, similar to Fig. 1, showing the position of the chain on the wheel when the chain is stretched, or worn;

Fig. 3 is a side view of a portion of a forty-eight tooth wheel with a new chain in position;

Fig. 4 is a view, similar to Fig. 3, showing a worn, or stretched chain in position.

In the manufacture of sprocket wheels for drive chains, it has been customary to make the flanks, or faces, of the teeth curved by arcs struck from certain centers, and, irrespective of the number of teeth, the location of the centers with reference to the teeth, is practically the same, so that the shape of a tooth and its height vary only slightly with the number of teeth, i. e., in large and small wheels designed to run with a certain chain of given size and pitch, the working faces of the teeth are practically alike.

At present sprocket wheels for malleable iron chains are designed on the theory that the joints of the chains always tend to lie on the root circle or circumference of the rim and that in a stretched chain one joint remains in driving contact with a tooth and all the others move away from the teeth by shifting on the root circle.

By my invention, the teeth of the wheels are so shaped that the driving action between the teeth and a worn chain is substantially the same as between the teeth and a new chain.

Figure 9:
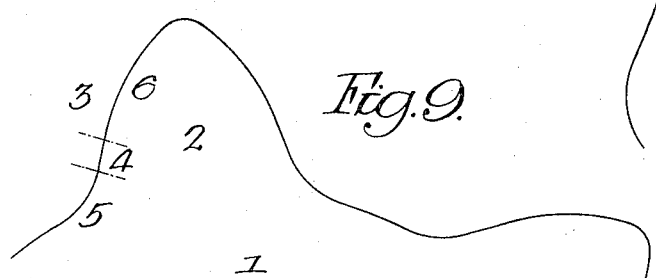

Referring to Figs. 1, 2 and 9, 1 is a six tooth sprocket wheel having teeth 2. The working face 3 of each tooth has a flat portion 4 connected to the root curve 5 and the top curve 6, clearly shown in Fig. 9. 7 is an ordinary type of malleable iron drive chain made of a series of links 8, each link having a pin 9 at one end and a socket 10 at the opposite end to receive the pin of an adjoining link. The outer surface of the sockets of the links is shaped to conform, more or less, to the root curve 5 when the chain is new, as in Fig. 1. As the chain wears, or elongates, the bearing faces of the sockets rides upon the flat portions 4 of the teeth so that all of the links of the chain are in driving contact with the teeth of the wheel, Fig. 2, in the same proportion as a new chain, Fig. 1. Consequently, the driving strain is distributed over a series of links of a worn, or elongated, chain, the same as in a new chain.

Figure 5:
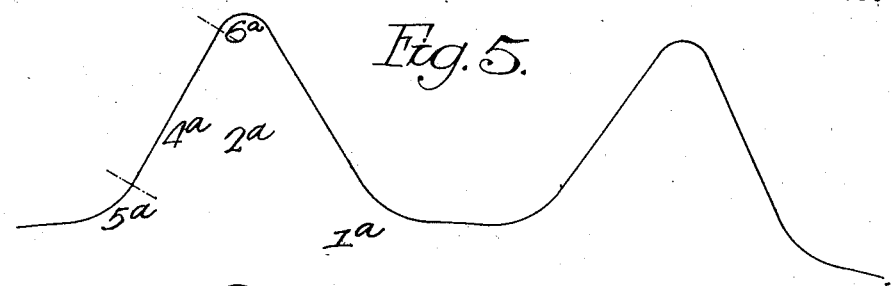
Figs. 5 to 9, both inclusive, are diagram views showing the shape of the teeth of wheels of different diameters and having a different number of teeth.

In Figs. 3, 4 and 5, the invention is illustrated as applied to a wheel having forty-eight teeth. It will be seen that the flat portion 4 of each tooth is much longer than in the wheel having six teeth, shown in Fig. 1, and that the root curve 5 is the same, but the top curve 6 is very short and the shape of the tooth is different from the tooth shown in Fig. 1.

1$^a$ is a sprocket wheel having forty-eight teeth 2$^a$. Each tooth has an extended, flat working face 4$^a$ connected to a root curve 5$^a$ and to a top curve 6$^a$.

Fig. 3 illustrates a new chain 7$^a$ in contact with the root circle and fitting the root curves of the teeth.

Fig. 4 shows a chain stretched and worn almost to the limit, in which the bearing surfaces of the sockets are resting against the outer ends of the teeth so that the driving contact of the chain on the teeth is the same in a worn, or stretched, chain as in a new chain.

Figure 6:
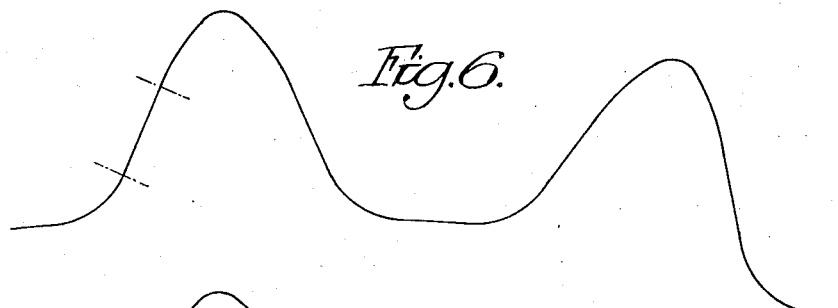
Figure 7:
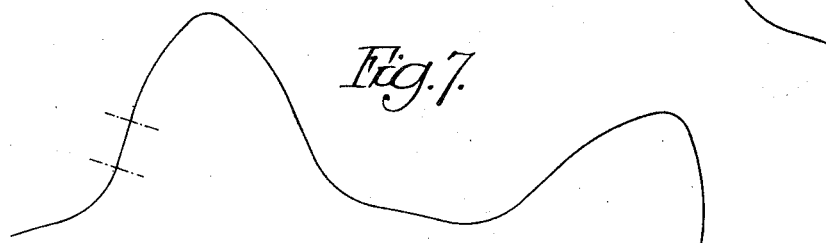
Figure 8:
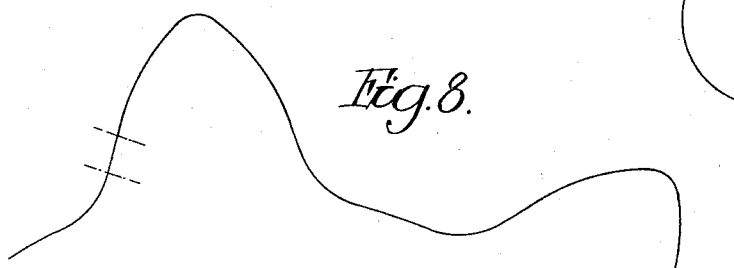

The pressure angle $a$ or so-called "bearing face angle," hereinabove noted, may be defined as the angle formed by dotted lines 11 and 12 which extend, respectively, from the center of one pin 9 to that of the next adjacent pin on the opposite side of the tooth and from the center of said first pin 9 to the flat portion 4 on said tooth in a direction perpendicular to the latter, all as shown in Fig. 2 of the drawing. In Fig. 4, the pressure angle $a$ is considerably larger than that of Fig. 2 but this is due to the increase in diameter of the wheel and the correspondingly larger number of teeth. Figs. 6, 7 and 8, which show sprocket wheels of different diameters and of different number of teeth, further illustrate the variation in the pressure angle with changes in the diameter of the wheel and the number of teeth. Hence, it is apparent that as the wheel increases in diameter and as the number of teeth also increases, the pressure angle $a$ of the flat bearing portion of each tooth increases as well as the length of said flat bearing portion. It will be understood that a chain having a certain amount of stretch per link used on a small wheel with few teeth need only have short, flat surfaces, but, to accommodate the same amount of stretch per link in a chain for a large wheel with a greater number of teeth, the teeth must have a proportionately longer flat portion.

I claim:

1. The combination in a sprocket wheel, of a rim on which the links of a specific chain may rest and have limited circumferential movement; and a series of teeth adapted to engage said links, the face of each tooth having a straight, flat portion, the length of which varies with the number of teeth in the wheel, and in which the pressure angle of the flat portion increases with the number of teeth in the wheel.

2. The combination in a sprocket wheel, of a rim on which the links of a chain may rest; and a series of teeth adapted to engage said links, the working sides of the teeth having flat faces, the length of which, for a chain of given pitch, is proportionate to the number of teeth in the wheel and to the maximum permissible stretch in the chain, and the slope of which, with reference to the longitudinal axes of the links, varies according to the number of teeth in the wheel.

3. The combination in a sprocket wheel, of a rim on which the links of a specific chain may rest; and a series of teeth adapted to engage said links, there being clearance between the teeth sufficient to permit considerable irregularity in the pitch of the chain, the faces of the teeth having a straight flat portion that will maintain driving contact with the links up to the point at which joint wear will seriously impair the strength of the chain, the pressure angle of the flat portion increasing according to the number of teeth in the wheel.

4. The combination in a sprocket wheel, of a rim on which the links of the chain may rest; and a series of teeth adapted to engage said links, the working face of each tooth having a root curve, a top curve and a straight flat section connecting the two curves, the length of the straight section, for a chain of a given pitch, being greater for a large number of teeth than for a smaller number of teeth in the wheel, and the pressure angle of said section increasing as the number of teeth in the wheel increases.

5. The combination in a sprocket wheel, of a rim on which the links of the chain may rest and have limited circumferential movement; and a series of teeth adapted to engage said links, the working face of each tooth having a root curve, a top curve and a straight flat section connecting the two curves, the length of the straight section, for a chain of a given pitch, being greater for a large number of teeth than for a smaller number of teeth in the wheel, and the pressure angle of said section increasing as the number of teeth in the wheel increases.

FREDERIC V. HETZEL.